United States Patent [19]

Hajny et al.

[11] Patent Number: 5,295,562
[45] Date of Patent: Mar. 22, 1994

[54] CENTRIFUGAL BRAKE

[75] Inventors: Roger V. Hajny, Cedarburg; Robert J. Pirkey, Germantown, both of Wis.

[73] Assignee: Johnson Service Company, Milwaukee, Wis.

[21] Appl. No.: 930,766

[22] Filed: Aug. 14, 1992

[51] Int. Cl.⁵ .............................................. F16D 55/00
[52] U.S. Cl. .................................. 188/187; 188/71.1; 188/82.9; 188/180; 192/105 C
[58] Field of Search ................ 188/187, 184, 185, 186, 188/180, 71.1, 82.1, 82.9; 192/105 B, 105 C

[56] References Cited

U.S. PATENT DOCUMENTS

| | | | |
|---|---|---|---|
| 587,265 | 7/1897 | MacDonald | 188/187 |
| 758,596 | 4/1904 | Moore et al. | 188/187 X |
| 785,126 | 3/1905 | Springer | 188/187 X |
| 1,245,112 | 10/1917 | La Rue | 188/187 X |
| 1,829,507 | 10/1931 | Crafts | 188/187 X |
| 3,038,109 | 6/1962 | Mowery, Jr. et al. | 188/187 X |
| 3,559,773 | 2/1971 | Hock | 188/187 |

FOREIGN PATENT DOCUMENTS 335231  9/1930  United Kingdom ................ 188/187

*Primary Examiner*—Douglas C. Butler
*Attorney, Agent, or Firm*—Foley & Lardner

[57] ABSTRACT

The present invention provides a centrifugal brake which, according to one aspect of the invention, has a center hub from which extend flex members terminating in tabs extending from the flex members. Disposed on the opposite side of each flex member from the tab, is a friction portion. The friction portion is brought into contact with a braking surface when the centrifugal brake is rotated at sufficient speeds so that the centrifugal force acting on the tabs causes the flex members to bend and bring the friction portions into contact with the braking surface thereby resisting further acceleration of the centrifugal brake.

18 Claims, 3 Drawing Sheets

5,295,562

CENTRIFUGAL BRAKE

TECHNICAL FIELD

The present invention relates generally to a centrifugal brake which applies resistance to rotation once the brake attains a given rotational velocity. The centrifugal brake is particularly useful in limiting the spring return rate of rotary electric actuators which use a spring return to move a device, such as an air vent damper, to a fail safe position in the event of a power failure.

BACKGROUND OF THE INVENTION

Centrifugal brakes are useful in numerous applications where it is necessary to resist the further acceleration of a rotating object. For various reasons, the speed at which a given device moves must be limited and if the device rotates or includes rotating parts, a centrifugal brake may often be used to take advantage of the centrifugal force generated by the rotating component. As the rotation velocity reaches a given level, the centrifugal brake engages to limit the rotational velocity and thus the speed of the moving device.

A typical situation where centrifugal brakes are helpful involves controlling the spring return rate of a rotary electric actuator. Such actuators are used in a variety of situations for controlling the position of devices such as valves, mechanical dampers, and the like, as employed in process control systems. For example, process control systems frequently use valves which may be adjusted to control the flow of fluids within a conductor system such as a pipeline. Other types of fluid flow control devices, often encountered in process control systems, include dampers which may be actuated for modulating the flow of gases.

Process control systems which use these actuators include heating, ventilating, and air conditioning (HVAC) systems that usually employ a plurality of air handling units comprising interconnected duct work associated with mechanical dampers. The duct work and dampers cooperate for controlling the flow of outside ambient air into a conditioned space, for controlling the flow of air from the space to the ambient, and for controlling air flow between cool and warm air ducts.

In the above-mentioned actuator systems, a power transmission is typically connected between a damper and an electric motor. The motor provides the power to turn the transmission and thus actuate the damper, valve, etc. Often, damper movement must be carefully controlled by an electronic control system so that the damper is appropriately positioned for the desired air flow. However, in the event of a power failure, the damper is usually returned to a fail safe position, such as completely closed or completely open. Spring returns are typically connected to the power transmission to return the actuator to the desired fail safe position.

In many applications, the return spring must be sufficiently strong to hold the actuator at the desired fail safe position with substantial force. For instance, it may be necessary to hold a building's air flow dampers in a closed position with substantial force to promote safety should there be a fire in the building.

When power to the electric motor is interrupted, the strength of the return spring causes great acceleration of the actuator, its power transmission, and the electric motor towards the fail safe position. This rapid rate of acceleration and high component velocities can cause damage to the actuator, the damper, or their component parts, particularly when the device reaches its fail safe position and abruptly stops.

It would be advantageous to use a centrifugal brake which responds to increasing rotational velocity to restrict further acceleration of the components once the rotational velocity reaches a certain level. In this fashion, the return spring would still quickly move the actuator to its fail safe position, but not at a rate which would cause damage.

The present invention addresses the foregoing drawbacks of systems which include rotational components subject to excess velocity.

SUMMARY OF THE INVENTION

The present invention provides a centrifugal brake which can be mounted on a rotatable shaft for cooperation with a stationary braking surface. The centrifugal brake comprises a center hub configured for attachment to the rotatable shaft. A flex member is attached to the center hub and has a distal end which is disposed a spaced distance from the hub. A tab, preferably a weighted tab, extends from the flex member, away from the braking surface. Disposed on the opposite side of the flex member from the tab is a friction portion disposed proximate the braking surface. When the centrifugal brake rotates at sufficient speed, the centrifugal force acting on the tab causes the flex member to flex towards the braking surface, bringing the friction portion into contact with the braking surface. This creates a resistance to rotation and limits the rotational velocity of the centrifugal brake and the rotatable shaft to which it is attached.

BRIEF DESCRIPTION OF THE DRAWING

The invention will hereafter be described with reference to the accompanying drawing, wherein like numerals denote like elements, and.

DETAILED DESCRIPTION OF PREFERRED EMBODIMENTS

In the following description, two preferred embodiments of centrifugal brakes are discussed. The centrifugal brakes will be described in conjunction with a rotary electric actuator with which they can be used. However, the description of two structures is not intended to limit the scope of the claims. Additionally, the description of the brakes in conjunction with the illustrated actuator is only an example of how a centrifugal brake might be used and does not limit the centrifugal brake to this particular use. This type of brake may have applications in many other systems where limitation of the rotational velocity of various components is required.

Figure 1:
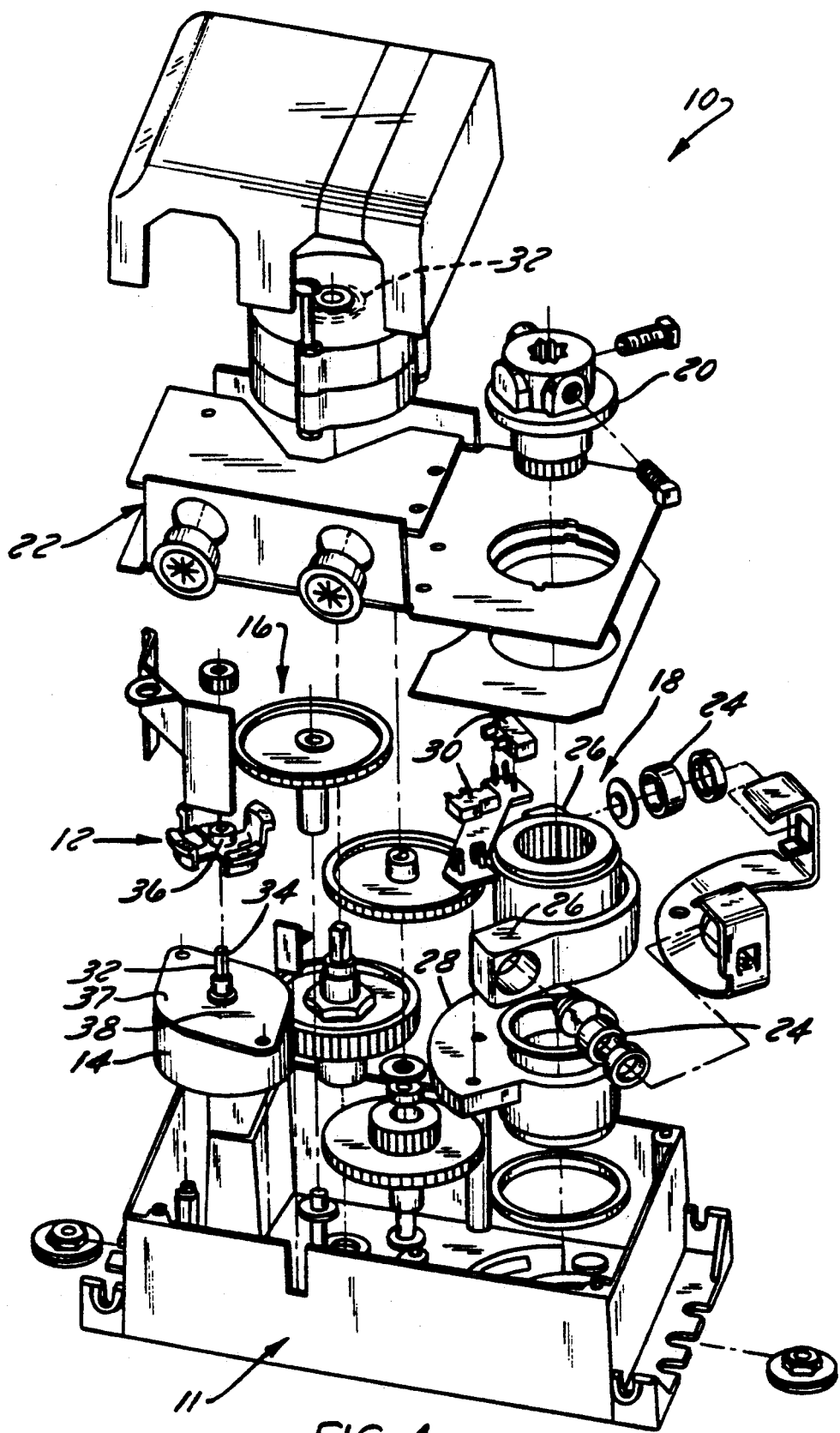
FIG. 1 is an exploded perspective view of a motor actuator which uses the centrifugal brake of the preferred form of the invention.
Figure 2:
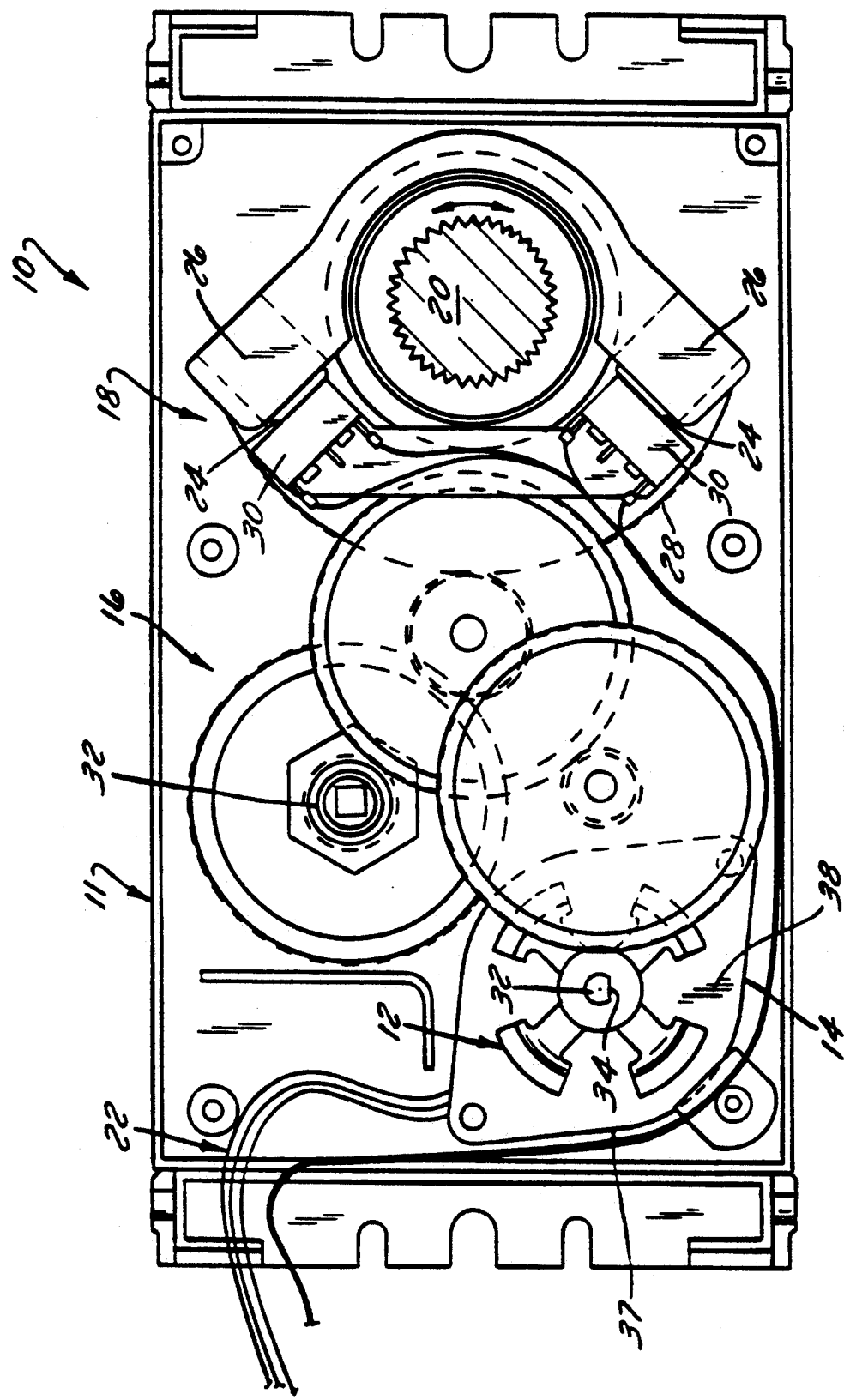
FIG. 2 is a cutaway view of the motor actuator of FIG. 1 showing its internal components including the centrifugal brake.

Referring now to FIGS. 1 and 2, an electric rotary actuator designated generally as 10, is shown to include an outer housing 11 and a centrifugal brake designated generally as 12. Other components of actuator 10 and their relative functions will now be described to help explain how centrifugal brake 12 may be used.

Actuator 10 includes an electric motor 14 connected to a power transmission 16 that is, in turn, connected to a force sensor assembly 18. Force sensor assembly 18 is configured to receive and hold an actuator shaft collar 20 so that collar 20 and assembly 18 have synchronous rotation. The collar 20 can be connected to an actuator shaft (not shown) which in turn is connected to a device (not shown) such as a valve, damper, etc. The force sensor assembly 18, collar 20, and actuator shaft are rotated together to open, close, or move the device to some intermediate position. If the actuator shaft is connected to a damper, for instance, the shaft will only need to be rotated approximately one quarter turn to move the damper between its open and closed positions. In the following description, the device being controlled by the actuator will be referred to as a damper.

A control circuit 22 receives inputs and controls the current to motor 14 to move the damper to the desired or preprogrammed position. Motor 14 controls the position of the damper by turning force sensor assembly 18 and collar 20 through power transmission 16. Power transmission 16 typically provides substantial reduction in rotational velocity between the output of electric motor 14 and collar 20. For example, the ratio of rotational velocity of motor 14 to the rotational velocity of collar 20 can be on the order of 1200 to 1. In other words, motor 14 must make 300 rotations to rotate collar 20 one quarter turn, a distance typically necessary to move a damper from a fully opened to a fully closed position. This large gear reduction allows motors having fairly small power outputs to exert a relatively large force on the damper through collar 20.

A pair of button force sensors 24 are used to ensure that only a given preprogrammed amount of force is placed on the damper. Button force sensors 24 are located in a pair of arms 26 on force sensor assembly 18 so that force sensors 24 abut against a sector gear 28 which is the final drive component of power transmission 16. As sector gear 28 is turned by motor 14 through transmission 16, pressure is placed against one or the other button force sensors 24 thereby rotating force sensor assembly 18 and collar 20.

Button force sensors 24 are adjustably spring loaded in arms 26 and a pair of plunger type switches 30 are mounted on sector gear 28 in close proximity to each arm 26. By placing one of the button force sensors 24 under sufficient force, its respective plunger switch 30 will be activated to prevent further rotation of motor 14. This will prevent greater exertion of force against the damper through collar 20. In other words, sector gear 28 moves against one of the spring loaded button force sensors 24 with sufficient force to overcome its spring load and physically move the button force sensor 65 far enough into its respective arm 26 so that the adjacent plunger switch 30 is contacted by the arm 26 and activated. Activating switch 30 will interrupt the current to motor 14 so that no more torque is placed on the damper.

Such a force sensing system can be very advantageous in an electric rotary actuator. For instance, if the damper must be held closed or open under a certain amount of torque, the button force sensors 24 can be adjusted so that motor 14 will impart the given amount of torque to the damper without over-torquing the damper or the components of actuator 10. Additionally, this provides a safeguard if some obstruction is placed in the path of motion of the damper. Since force sensors 24 and switches 30 limit the force exerted against the obstruction, they similarly prevent any damage to the damper or to the components of actuator 10.

A spring assembly 31 including a conventional coil spring (not shown) is connected to power transmission 16. Spring assembly 31 functions to return actuator 10 and its attached damper to a fail-safe position in the event power to control circuit 22 and motor 14 is interrupted. For example, if there is a fire in the building which causes a power outage, it may be desirable to have the damper returned to a closed position and held there under a substantial amount of torque. Thus, as electric motor 14 moves the damper away from its fail-safe position, power transmission 16 winds spring assembly 31 more tightly, storing more potential energy, and placing greater spring torque on power transmission 16. If power fails while the damper is at a point distant from its fail-safe position, spring assembly 31 has a great amount of stored potential energy and rapidly spins power transmission 16, motor 14, and the damper to the fail-safe position. The momentum of the rapidly spinning components can damage actuator 10 or the damper when the damper abruptly reaches its fail-safe position.

This problem is compounded by the spring loaded button force sensors 24, since they store additional potential energy. For example, if the damper is rotated to its fully open position, motor 14 will continue to rotate power transmission 16 until sector gear 28 moves the applicable button force sensor against its spring load and activates plunger switch 30. If power to actuator 10 is interrupted at this point, motor 14 will no longer hold the damper in its open position and the potential energy of both spring loaded button sensor 24 and spring assembly 31 will be unleashed to rapidly accelerate the actuator components and spin the damper to its fail-safe position.

In a typical actuator 10, motor 14 will, under normal conditions, run at approximately 300 RPMs, but spring assembly 31 in combination with the force of a spring loaded button sensor 24 can accelerate motor 14 to speeds in excess of 6000 rotations per minute, unless a centrifugal brake, such as the brake 12, is used. Accordingly, brake 12 will slow the acceleration and limit the attainable velocity of the various components of actuator 10.

Centrifugal brake 12 is mounted on a rotatable shaft 32, in this case the drive shaft of motor 14. Preferably, rotatable shaft 32 includes a flat side 34 which matingly engages with a keyed portion 36 of brake 12 to prevent rotation of centrifugal brake 12 with respect to shaft 32. Centrifugal brake 12 must be pressed onto rotatable shaft 32 sufficiently far so that the centrifugal brake is in close proximity to a brake plate 37 having a braking surface 38 disposed towards centrifugal brake 12. At sufficient rotational speeds, centrifugal brake 23 interacts with brake plate 37 to resist further acceleration of centrifugal brake 12 and shaft 32.

Figure 3:
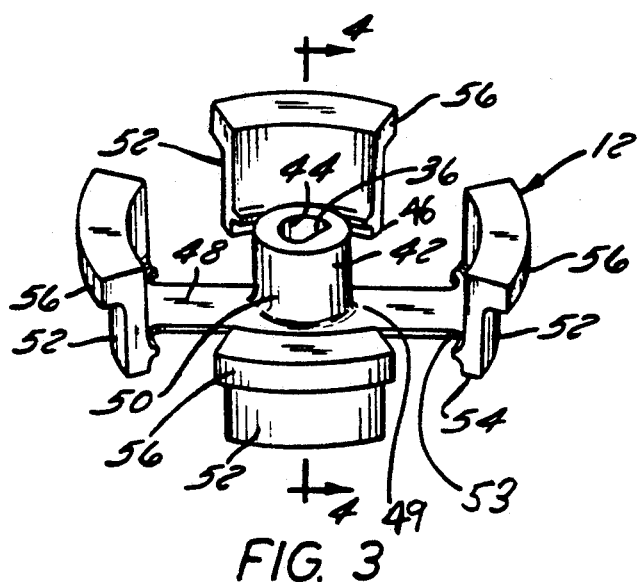
FIG. 3 is a perspective view showing a centrifugal brake according to the preferred embodiment of the invention.
Figure 4:
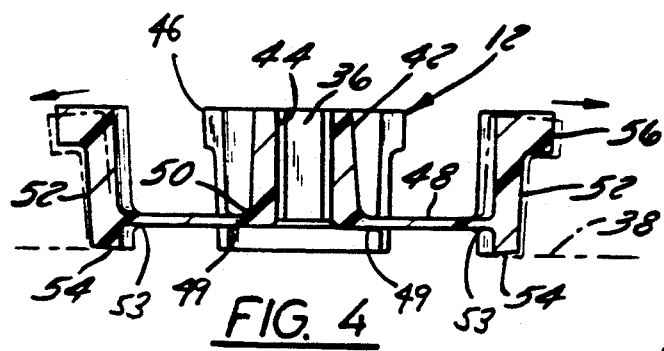
FIG. 4 is a cross-sectional view taken generally along line 4—4 of FIG. 3.
Figure 4A:
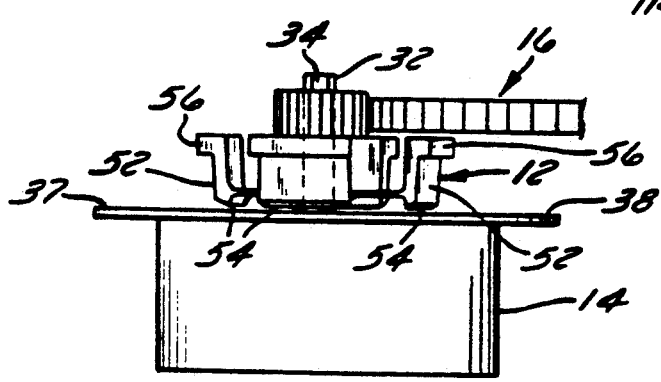
FIG. 4A is a side plan view of the centrifugal brake positioned on the shaft.

Referring now to FIGS. 3, 4 and 4A, centrifugal brake 12 includes a center hub 42 having a bore 44 therethrough. Bore 44 terminates at a first end 46 of center hub 42 in keyed portion 36. A flex member 48, including approximal end 49 affixed to center hub 42, extends radially outward from center hub 42 and preferably from a second end 50 of center hub 42. In the preferred embodiment, flex member 48 lies in a plane generally parallel with braking surface 38 when centrifugal brake 12 is disposed on rotatable shaft 32.

A tab 52, preferably a weighted tab, extends from a distal end 53 of flex member 48 in a direction generally perpendicular to braking surface 38 and a friction portion 54 is on the lower end of tab 52 in close proximity to and facing braking surface 38.

In a preferred embodiment, centrifugal brake 12 includes four flex members 48 each having the tab 52 and the friction portion 54. Also in the preferred embodiment, each tab 52 includes an offset mass 56 disposed at a spaced distance from flex member 48. Additionally, friction portion 54 preferably extends away from flex member 48 towards braking surface 38.

Many variations of the centrifugal brake are possible. For instance, flex members 48 can extend at different angles from hub 42, as long as friction portion 54 is disposed sufficiently close to braking surface 38 when centrifugal brake 12 is placed on its rotatable shaft 32.

Figure 5:
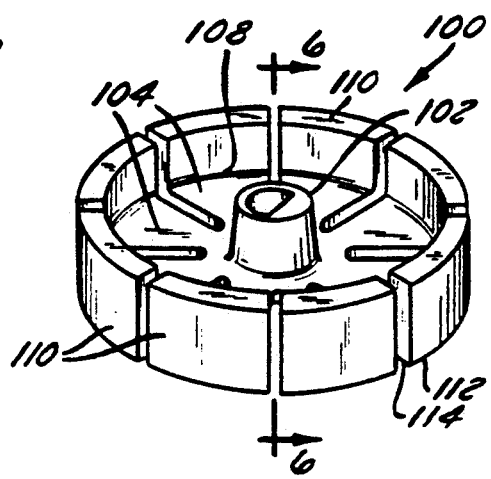
FIG. 5 is a perspective view of an alternative embodiment of the invention.
Figure 6:
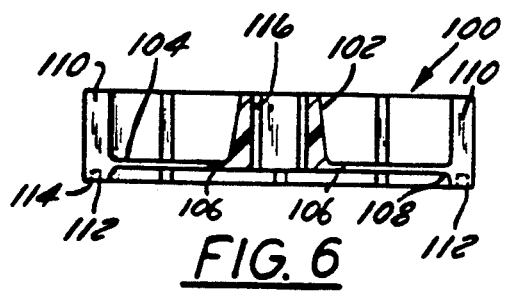
FIG. 6 is a cross-sectional view taken generally along line 6—6 of FIG. 5.

In an alternative embodiment, shown generally in FIGS. 5 and 6, a centrifugal brake 100 includes a center hub 102 from which a plurality of flex members 104 radially extend. Flex members 104 include a proximal end 106 affixed to center hub 102. Flex members 104 each terminate in a distal end 108 to which is affixed a tab 110. Flex members 104 are generally narrower near the center hub 102 and broader or expanded where affixed to tabs 110. Each of the tabs 110 extends in a direction generally perpendicular to brake surface 38 and to flex members 104. Disposed on the lower end of each tab 110 is a friction portion 112 including a contact surface 114 designed for contact with braking surface 38.

Centrifugal brake 100 works very similar to centrifugal brake 12 described above and effectively resists further acceleration by engaging braking surface 38 when sufficient rotational speeds are reached. Centrifugal brake 100 is similarly attached to rotatable shaft 32, preferably by receiving shaft 32 into a bore 116 and preventing rotation of centrifugal brake 100 with respect to rotatable shaft 32 by any of a variety of ways as discussed above, including the use of a keyed portion, the use of adhesive, etc.

In operation, the centrifugal force acting on each tab 52 and offset mass 56 forces tabs 52 and offset masses 56 in the radially outward direction, thus creating a moment in flex members 48. As the rotational speed of centrifugal brake 12 is increased, the moment or torque acting on flex members 48 will increase and bend flex members 48 in a direction towards braking surface 38 until friction portion 54 contacts braking surface 38. If the rotational speed of centrifugal brake 12 is increased still further, the torque acting on flex member 48 will be increased and the force by which friction portion 54 is pressed against braking surface 38 will correspondingly be increased to produce a greater braking effect and resistance to further acceleration of centrifugal brake 12. It should be noted that the mass of each tab 52 (including offset mass 56) must be greater than the mass of the corresponding friction portion 54 so that the centrifugal force acting on each tab 52 overcomes the centrifugal force acting on each friction portion 54 to bend the corresponding flex member 48 towards braking surface 38.

Centrifugal brake 12 may be adjusted in many ways to alter the braking effect or to change the rotational velocity required to initiate the braking effect. For instance, the mass of tabs 52 and/or offset masses 56 can be increased or decreased to respectively increase or decrease the torque acting on flex members 48 at a given rotational velocity. Additionally, the cross-sectional area or shape of flex members 48 can be changed to increase or decrease the flexural rigidity thereof. The distance between friction portions 54 and the braking surface 40 can also be increased or decreased to change the rotational velocity required to initiate the braking effect. If friction portions 54 are farther away from braking surface 38, a greater rotational speed will be required to create enough torque on flex members 48 to move friction portions 54 through the increased distance and into contact with braking surface 38.

Centrifugal brake 12 is preferably made as an integral unit comprising a single material. The material is preferably a rubber or plastic material such as Delrin 500 CL made by the DuPont Company.

It will be understood that the foregoing description is of preferred exemplary embodiments of this invention, and that the invention is not limited to the specific forms shown. For example, different materials may be used in forming the centrifugal brake, different sized tabs and/or offset masses may be used, various numbers and configurations of flex members may be used, etc. These and other modifications may be made in the design and arrangement of the elements without departing from the scope of the invention as expressed in the appended claims.

What is claimed is:

1. A centrifugal brake which can be mounted on a rotatable shaft for cooperation with a stationary braking surface, comprising:
    a center hub configured for attachment to the rotatable shaft;
    at least one flex member having a proximal end and a radially distal end, wherein said proximal end is coupled to said hub and said distal end is disposed a spaced distance from said hub;
    a tab extending at an angle from said radially distal end of each of said flex members and generally away from said stationary braking surface; and
    a friction portion affixed to said tab and disposed proximate the braking surface, wherein when said centrifugal brake rotates at sufficient speed, the centrifugal force acting on said tab causes said flex member to bend towards the braking surface, bringing said friction portion into contact with the braking surface, thereby creating a resistance to rotation of said centrifugal brake.

2. The centrifugal brake of claim 1, wherein said tab includes an offset mass disposed a spaced distance from said flex member.

3. The centrifugal brake of claim 2, wherein said offset mass is an integral part of said tab.

4. The centrifugal brake of claim 1, wherein said center hub, said flex member, said tab, and said friction portion are integrally formed from a resin.

5. The centrifugal brake of claim 1, further comprising a plurality of tabs.

6. The centrifugal brake of claim 5, further comprising a plurality of flex members and wherein each flex member includes one of said tabs.

7. The centrifugal brake of claim 6, wherein said centrifugal brake includes at least four of said flex members and tabs.

8. The centrifugal brake of claim 1, wherein said center hub includes a bore in which the rotatable shaft is fixed.

9. The centrifugal brake of claim 8, wherein said center hub includes a keyed portion to prevent the rotatable shaft from rotating with respect to said centrifugal brake when the rotatable shaft is received in said bore.

10. The centrifugal brake of claim 1, wherein said friction portion extends from said flex member towards the stationary braking surface, said friction portion having less mass than said tab.

11. A centrifugal brake for mounting on a rotatable shaft and for cooperation with a stationary braking surface, comprising:
- a hub having a bore through which the shaft extends, said hub being affixed to the shaft;
- at least one flex member affixed to said hub, each flex member extending radially outward from said hub, each flex member ending at a radially distal end;
- a tab extending from said distal end of each flex member in a direction away from the stationary braking surface; and
- a friction portion disposed on said tab and located adjacent the stationary braking surface, wherein when said centrifugal brake rotates at sufficient speed, the centrifugal force acting on said tab caused said flex member to bend towards the stationary braking surface bringing said friction portion into contact with the stationary braking surface, thereby creating resistance to rotation of said centrifugal brake and the shaft to which it is attached.

12. The centrifugal brake of claim 11, further comprising a plurality of flex members, wherein each of the flex members includes a tab having a friction portion.

13. The centrifugal brake of claim 12, wherein said plurality of flex members comprises eight flex members.

14. The centrifugal brake of claim 12, wherein said hub, said flex members, said tabs, and said friction portions are integrally molded from resin.

15. A centrifugal brake assembly for use in a rotary electric actuator, the actuator having an electric motor connected to an actuator collar via a power transmission, and a spring return connected to the power transmission for returning the actuator collar to a fail safe position when power to the actuator is interrupted, said centrifugal brake assembly comprising:
- an electric motor shaft extending from the electric motor and connected to the power transmission for rotating the power transmission;
- a stationary braking plate through which said electric motor shaft rotatably extends; and
- a centrifugal brake affixed to said electric motor shaft in proximity to said braking plate, said centrifugal brake including a flex member extending radially outward from said electric motor shaft, a tab extending out of said flex member away from said brake plate, and a friction portion having less mass than said tab and extending out of said flex member towards said brake plate, wherein when power is interrupted and the spring return accelerates said electric motor shaft and said centrifugal brake to sufficient rotational speeds, the centrifugal force acting on said tab causes said flex member to bend, bringing said friction portion into contact with said brake plate, thereby resisting any further acceleration of said electric motor shaft.

16. The centrifugal brake assembly of claim 15, further comprising a plurality of flex members, wherein a tab and a friction portion extends from each flex member.

17. The centrifugal brake assembly of claim 16, wherein said flex members, said tabs, and said friction portions are integrally molded from resin.

18. The centrifugal brake assembly of claim 17, wherein said flex members extend generally parallel with said stationary brake plate when said centrifugal brake is not rotating.

* * * * *

UNITED STATES PATENT AND TRADEMARK OFFICE
CERTIFICATE OF CORRECTION

PATENT NO. : 5,295,562
DATED : March 22, 1994
INVENTOR(S) : Robert J. Pirkey, et al It is certified that error appears in the above-indentified patent and that said Letters Patent is hereby corrected as shown below:

On title page, item [19] "Hajny et al." should read --Pirkey et al.--

Signed and Sealed this

Sixth Day of September, 1994

Attest:

BRUCE LEHMAN

Attesting Officer — Commissioner of Patents and Trademarks